J. CUNNING.
HOG SCRAPING MACHINE.
APPLICATION FILED MAY 3, 1909.

1,050,521.

Patented Jan. 14, 1913.
9 SHEETS—SHEET 1.

Witnesses
Frank A. Fahl,
Thomas W. McMeans.

Inventor
James Cunning,
By Bradford & Hood,
Attorneys

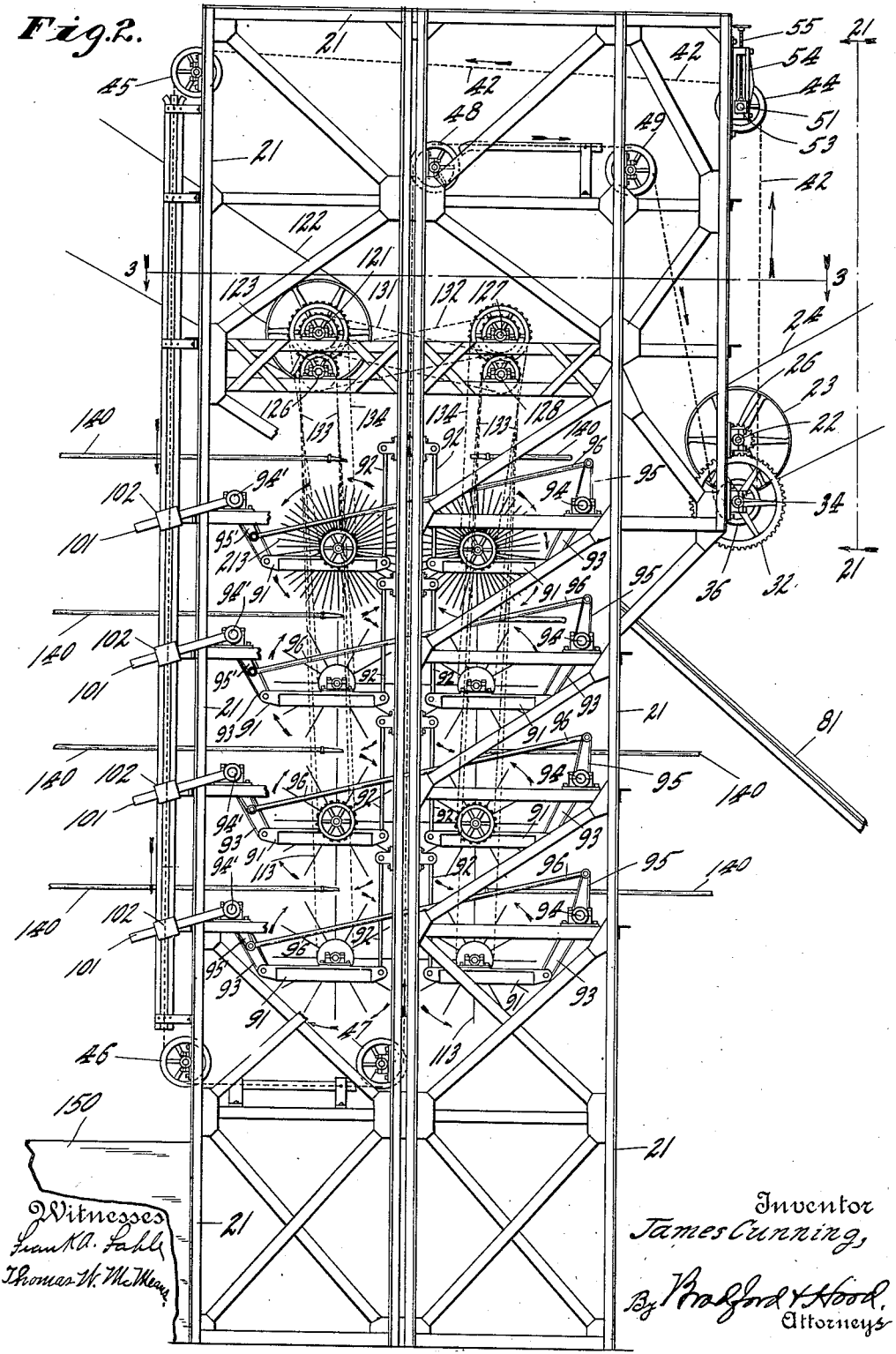

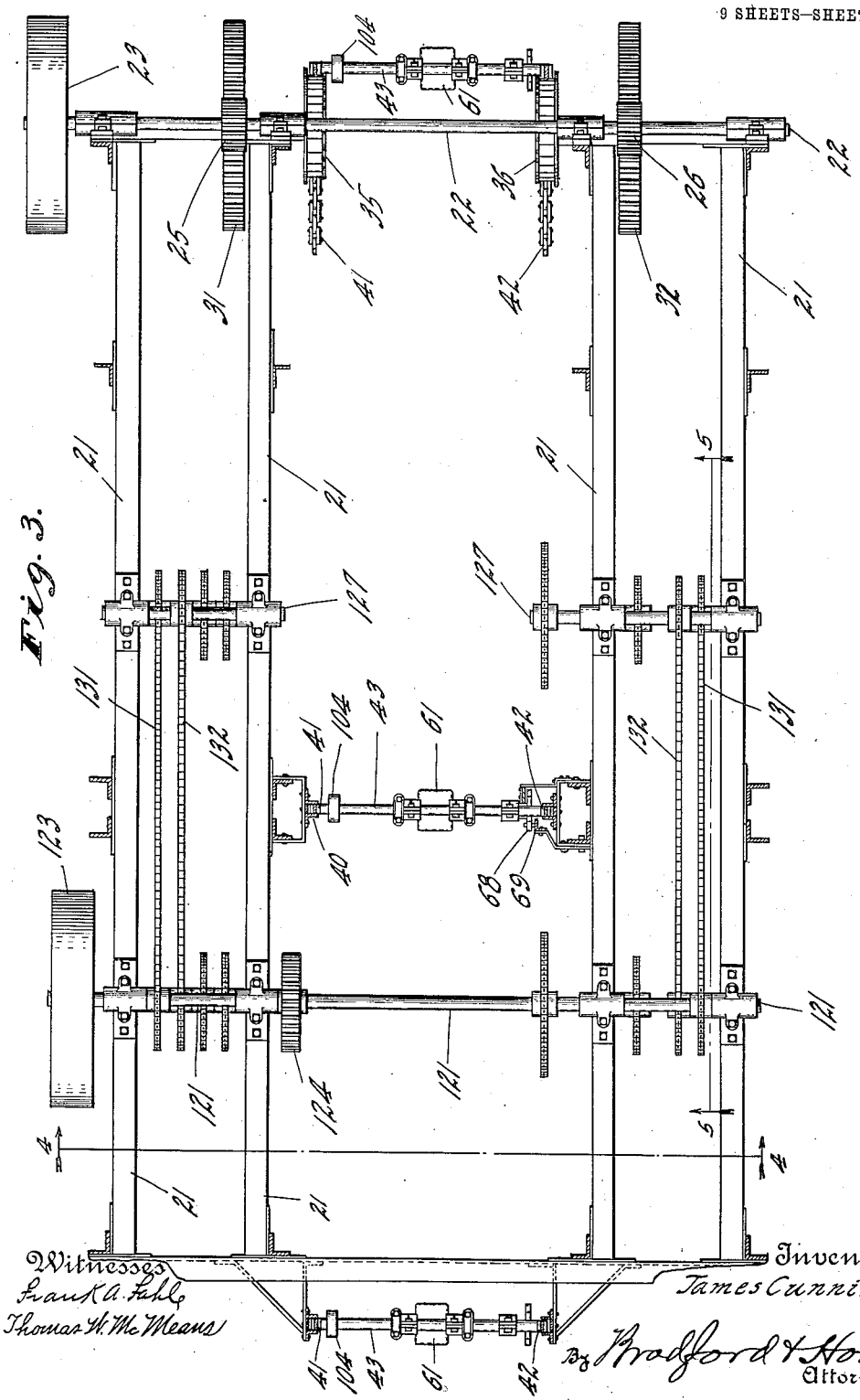

J. CUNNING.
HOG SCRAPING MACHINE.
APPLICATION FILED MAY 3, 1909.
1,050,521.
Patented Jan. 14, 1913.
9 SHEETS—SHEET 4.
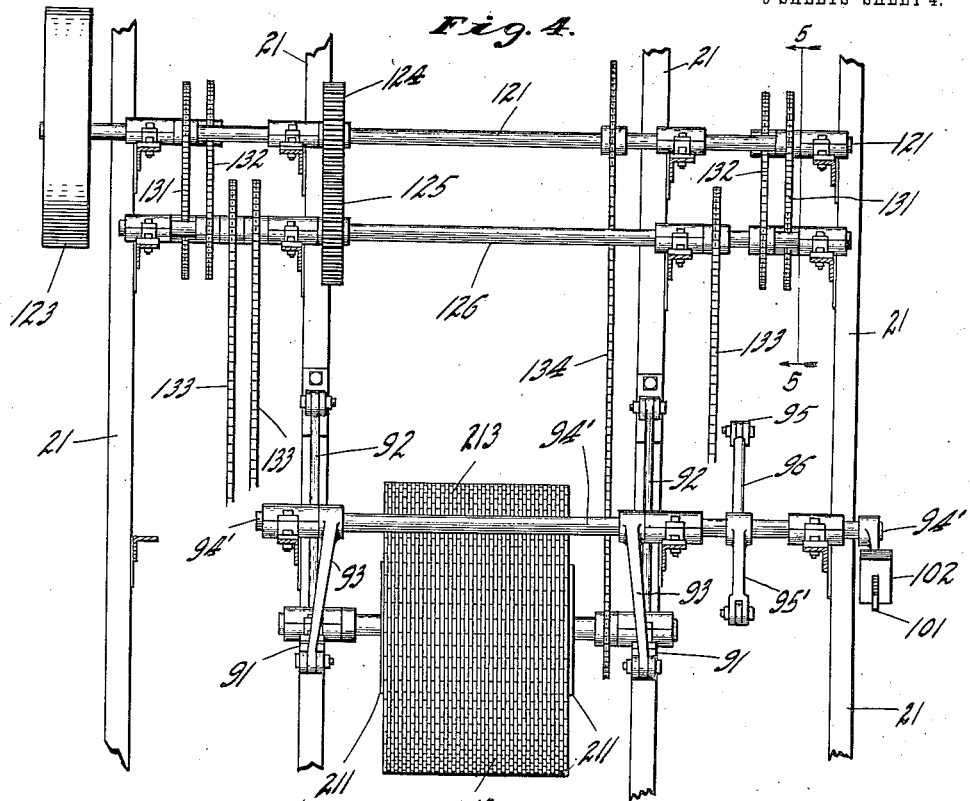
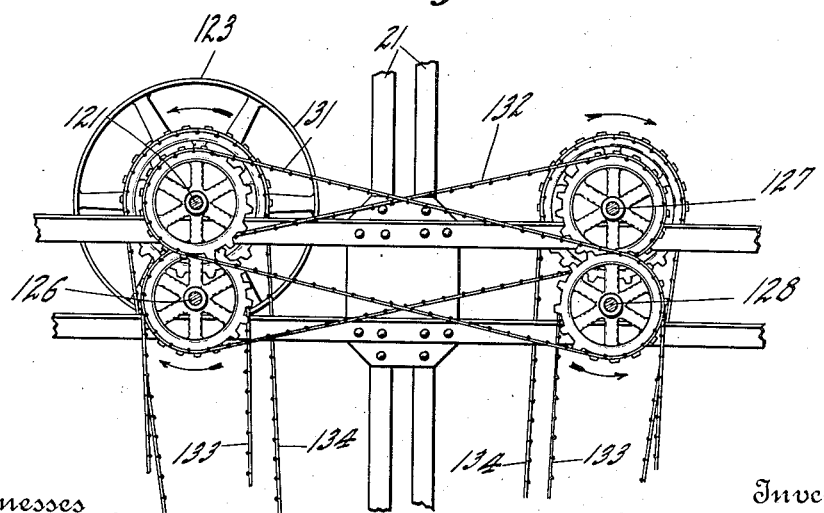

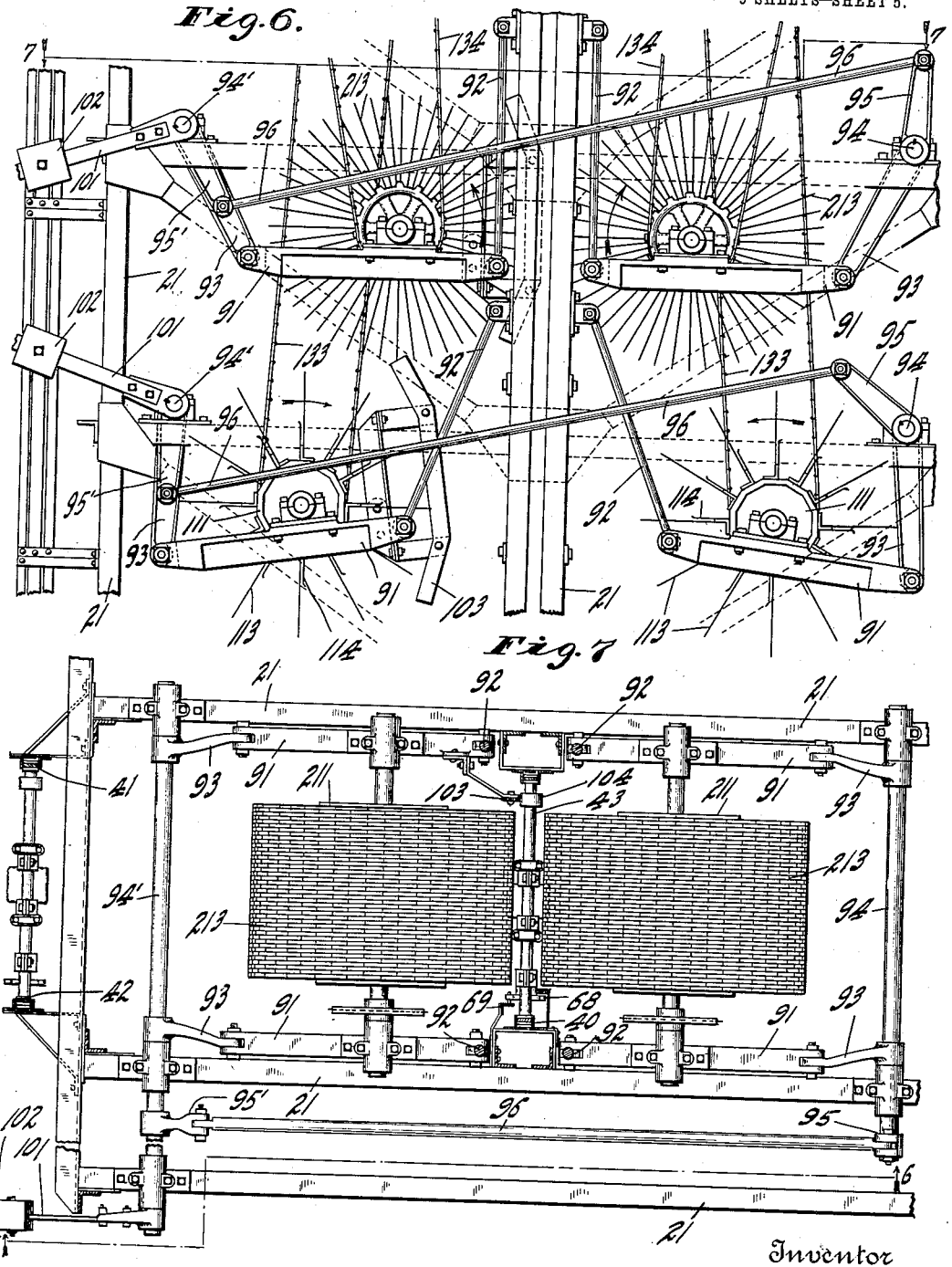

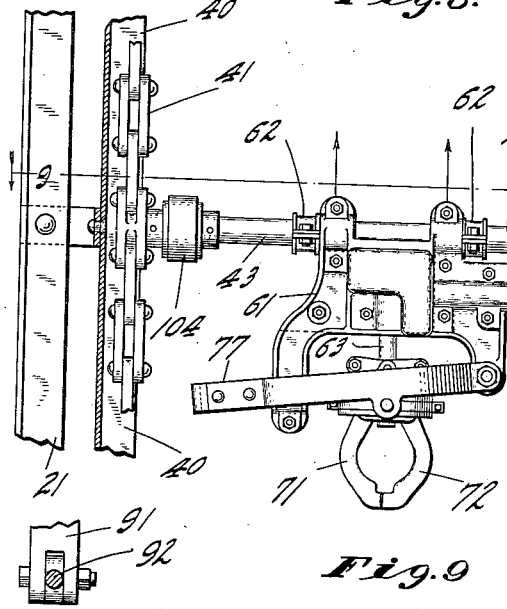
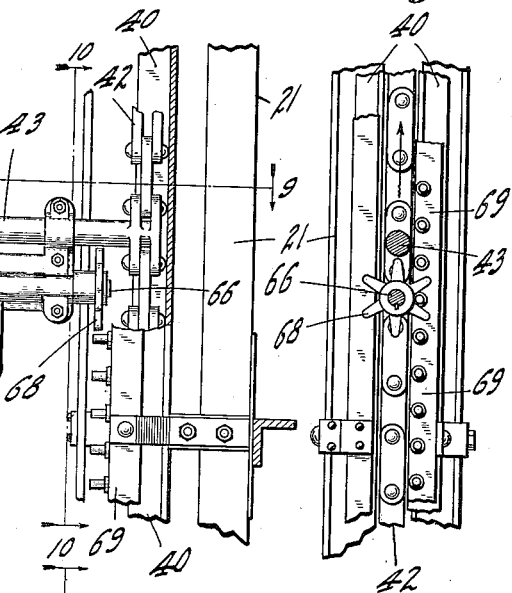
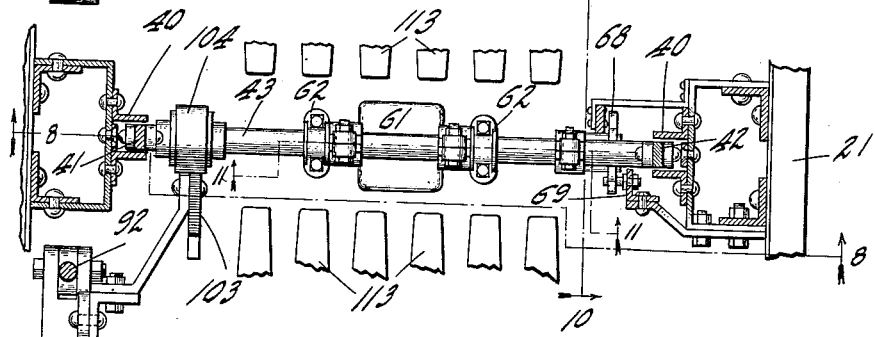
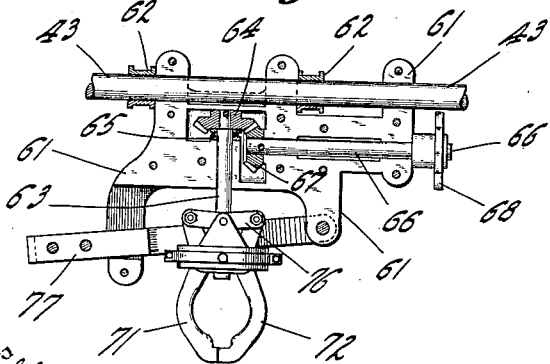

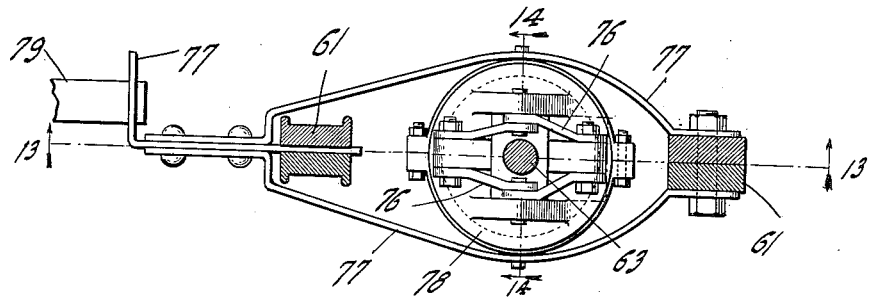
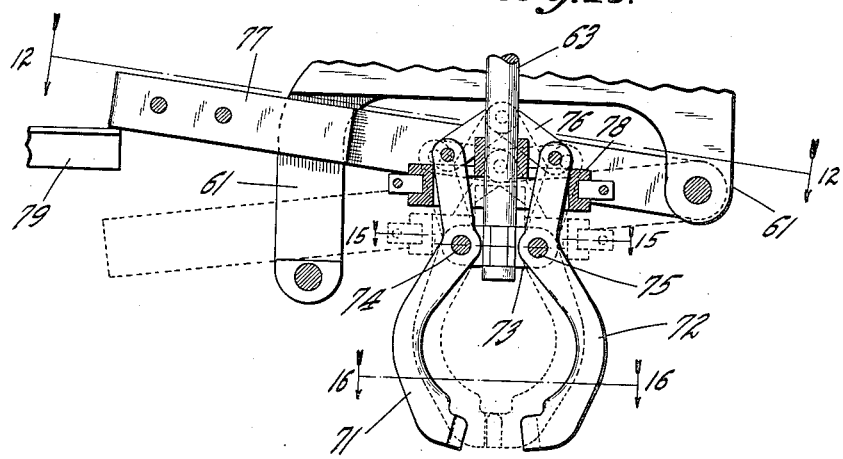
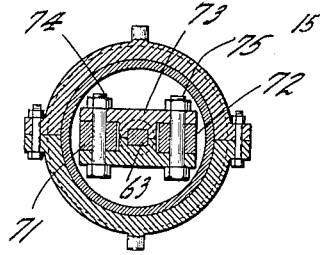
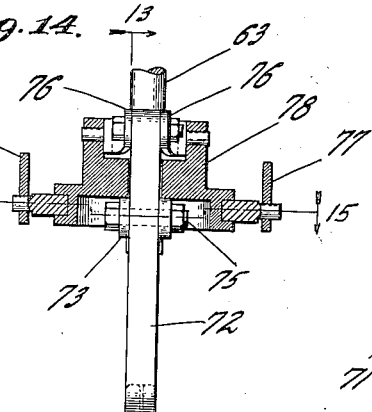
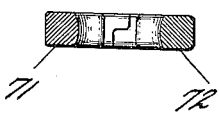

J. CUNNING.
HOG SCRAPING MACHINE.
APPLICATION FILED MAY 3, 1909.

1,050,521.

Patented Jan. 14, 1913.

9 SHEETS—SHEET 8.

Witnesses
Frank A. Fahle
Thomas W. McMeans

Inventor
James Cunning,
By Bradford & Hood,
Attorneys

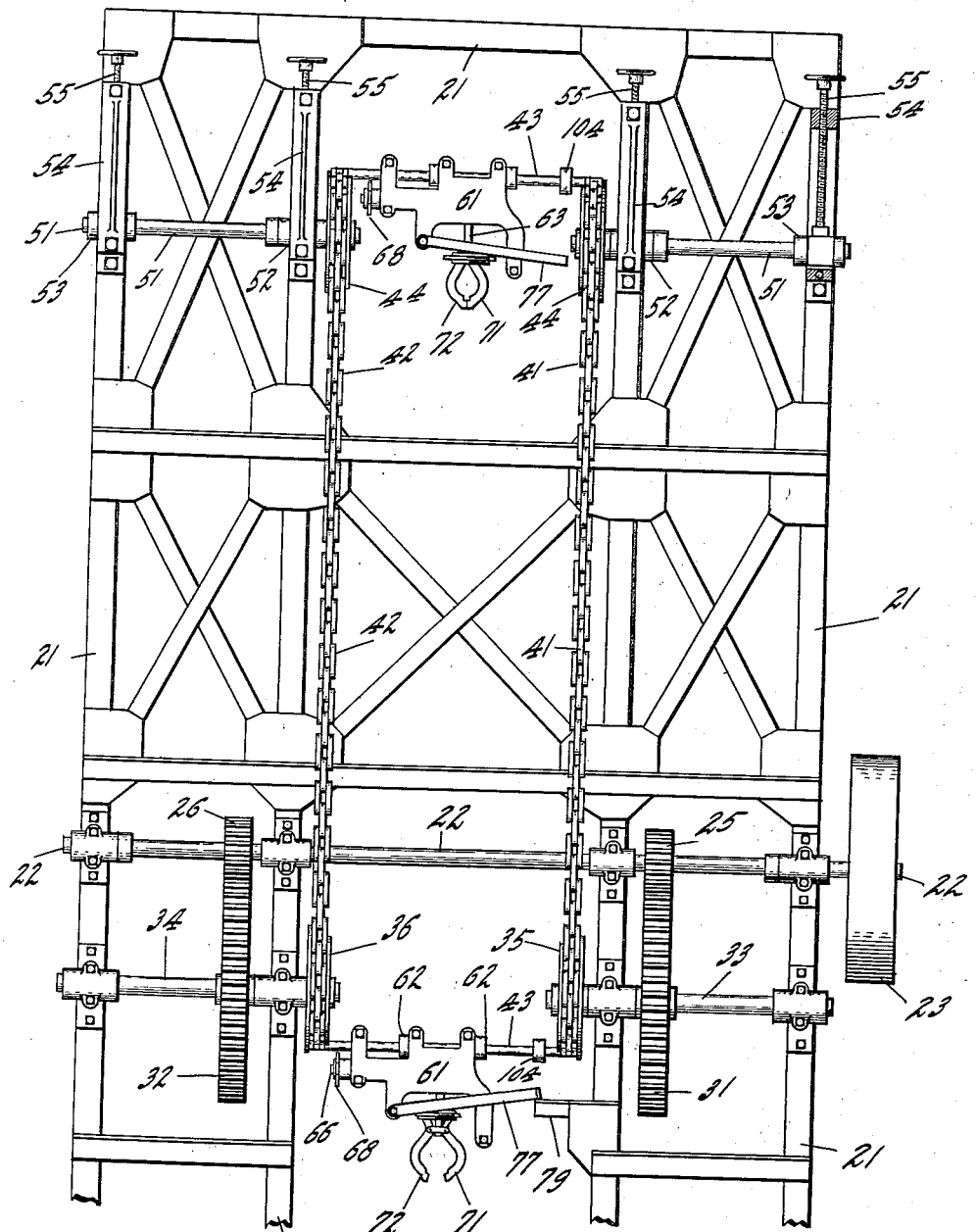

UNITED STATES PATENT OFFICE.

JAMES CUNNING, OF INDIANAPOLIS, INDIANA.

HOG-SCRAPING MACHINE.

1,050,521.     Specification of Letters Patent.    Patented Jan. 14, 1913.

Application filed May 3, 1909. Serial No. 493,567.

*To all whom it may concern:*

Be it known that I, JAMES CUNNING, a citizen of the United States, residing at Indianapolis, in the county of Marion and State of Indiana, have invented certain new and useful Improvements in Hog-Scraping Machines, of which the following is a specification.

The object of my invention is to provide a machine by means of which the hair and bristles may be rapidly and efficiently removed from hogs during the slaughtering operation.

It consists, generally speaking, in a machine or apparatus embodying a traveling carrier to which the carcasses of the hogs are attached, with a series of yieldingly mounted rotating drums armed with scraping blades positioned at intervals alongside the path of the carrier, and means for attaching the carcasses to the carrier, and causing them to be revolved as they pass between the scraping instrumentalities so that every part of the carcass shall be subjected to the scraping action.

It further consists in various features of construction and arrangement, all as will be hereinafter more particularly described and claimed.

Figure 1:
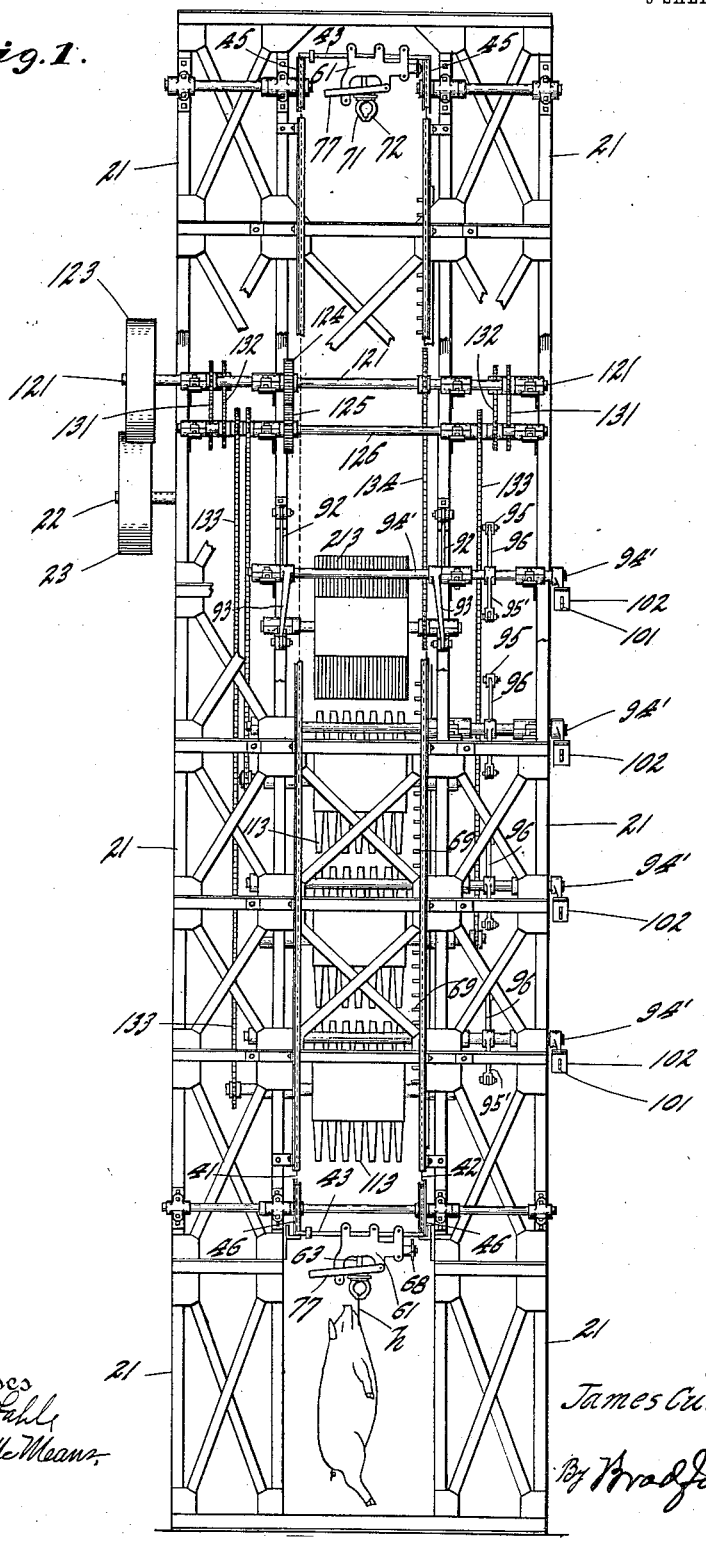
Figure 17:
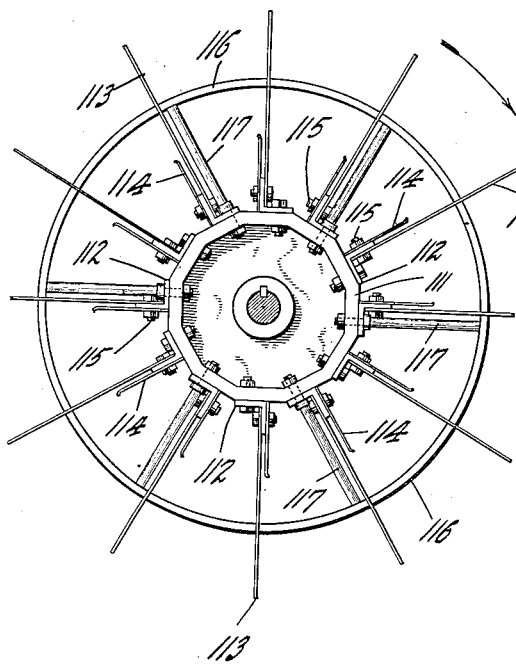
Figure 18:
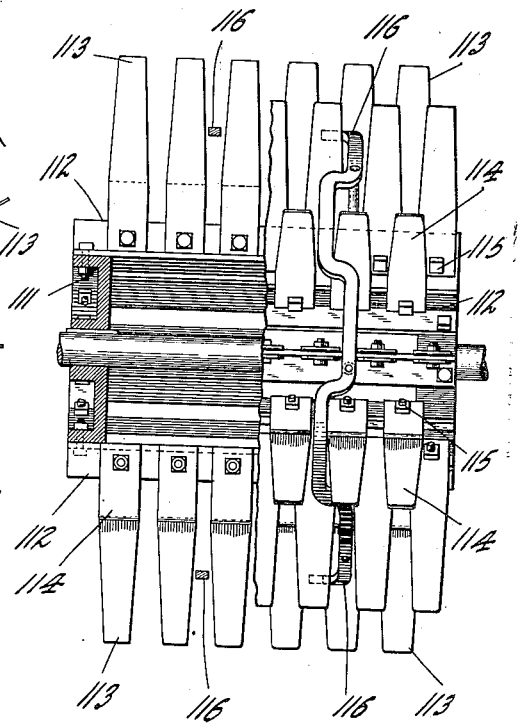
Figure 19:
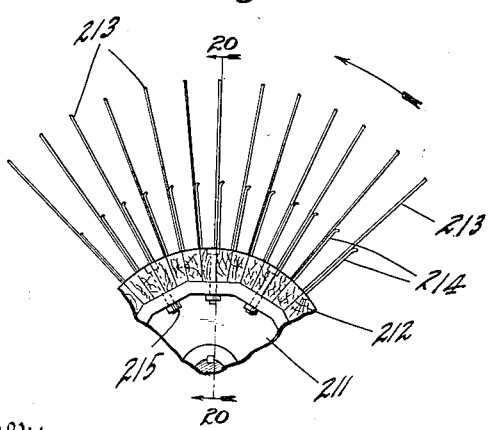
Figure 20:
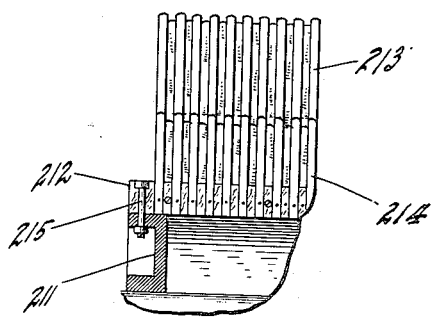

Referring to the accompanying drawings, which are made a part hereof, and on which similar reference characters indicate similar parts, Figure 1 is a front elevation of a machine of the character in question embodying my present invention; Fig. 2 a side elevation thereof; Fig. 3 a plan sectional view, on an enlarged scale, as seen when looking downwardly from the broken line 3 3 in Fig. 2, showing the driving shafts, chains and carrier, but omitting the scraping drums and much of the accompanying mechanism; Fig. 4 a vertical sectional view as seen when looking in the direction indicated by the arrows from the broken line 4 4 in Fig. 3; Fig. 5 a detail vertical sectional view as seen when looking in the direction indicated by the arrows from the broken lines 5 5 in Figs. 3 and 4; Fig. 6 a detail side elevation similar to a portion of Fig. 2 but on an enlarged scale, a portion of the frame work being broken away to show the mechanism more clearly, the viewpoint being from the broken line 6 6 in Fig. 7, and looking in the direction indicated by the arrows; Fig. 7 a horizontal sectional view as seen when looking downwardly from the broken line 7 7 in Fig. 6; Fig. 8 a detail sectional front elevation illustrating particularly a fragment of the carrier, and one of the shackles to which the carcass is attached in operation and its operating means, on an enlarged scale, as seen when looking in the direction indicated by the arrows from the broken line 8 8 in Fig. 9; Fig. 9 a horizontal sectional view looking downwardly from the broken line 9 9 in Fig. 8; Fig. 10 a vertical sectional view as seen when looking in the direction indicated by the arrows from the broken lines 10 10 in Figs. 8 and 9, and illustrating the guideways for the carrier, and the operating means for operating the shackles; Fig. 11 a detail sectional view of the shackle and immediately adjacent parts as seen from the broken line 11 in Fig. 9, the position being the same as in Fig. 8; Fig. 12 a horizontal sectional view of the shackle and immediately adjacent parts on a still further enlarged scale, as seen when looking in the direction indicated by the arrows from the broken line 12 12 in Fig. 13; Fig. 13 a detail sectional view as seen when looking in the direction indicated by the arrows from the broken line 13 13 in Figs. 12 and 14, this differing from Fig. 11 in that the open position of the shackle is shown, the closed position being indicated by means of dotted lines; Fig. 14 a detail sectional view as seen when looking in the direction indicated by the arrows from the broken line 14 14 in Fig. 12; Fig. 15 a detail horizontal sectional view at the point indicated by the broken line 15 15 in Figs. 13 and 14; Fig. 16 a horizontal sectional view at the point indicated by the broken line 16 16 in Fig. 13; Fig. 17 an end elevation of one of the scraping drums separately; Fig. 18 a view partially in side elevation and partially in central vertical section of the drum shown in Fig. 17; Fig. 19 a view of a fragment (as seen from the end) of a scraping drum of a different form, being the form preferably used in the last or upper series in the machine; Fig. 20 a fragmentary sectional view at the point indicated by the broken line 20 20 in Fig. 19, and Fig. 21 a detail view on an enlarged scale as seen from the broken line 21 21 alongside Fig. 2.

The mechanism of this invention is mounted upon a large and preferably permanently-erected frame 21, which is made of either wood or metal, but preferably the latter, and should be strongly braced, as best illustrated in Figs. 1 and 2 of the drawing. At a suitable point is located a driving shaft 22 bearing a driving pulley 23 to which a driving belt 24 runs from some suitable source of power (not shown). This driving shaft 22 has thereon spur pinions 25 and 26 which engage with spur gear wheels 31 and 32 on countershafts 33 and 34, carrying driving wheels 35 and 36 for the carrier. The carrier is composed of two chains 41 and 42 having a suitable number of cross bars 43 upon which the shackles, to which the carcasses of the hogs are attached in operation, are mounted. The position of this carrier is indicated by dotted lines in Figs. 1 and 2, and its direction of travel is indicated by arrows placed alongside said lines. Starting from the driving wheels, it passes upwardly over sheaves 44, thence to the opposite side of the frame and over sheaves 45, thence downwardly to near the bottom of the frame and over sheaves 46, thence horizontally to and over sheaves 47, thence upwardly between the guide tracks, and between the scrapers, to and over sheaves 48, thence again horizontally to and over sheaves 49, and thence down to the driving wheels 35 and 36 before described. This path may of course be varied to suit the location; but I consider it to be a desirable one where circumstances permit. The chains of the carrier are kept at the proper tension by means of suitable adjusting devices attached to the bearings carrying the shafts of certain of the sheaves. I have shown such shafts 51 provided with suitable adjustable bearings 52 and 53 mounted in frames 54 and provided with adjusting screws 55, in connection with the sheaves 44. By manipulating these screws properly, the tension of the carrier chains can be regulated as desired, as will be readily understood by an examination of the drawings, especially Figs. 2 and 21.

As heretofore stated, the attached shackles are carried by the cross bars 43 of the carrier, as best shown in Fig. 8 and succeeding figures. A frame 61 is suspended to cross bar 43, by embracing portions thereof which extend around said cross bar, and are held to the proper points longitudinally thereof by means of suitable set collars 62. The shackle proper is mounted in and carried by this frame 61. As best shown in Fig. 11, the shackle shank 63 is mounted to revolve or swivel in a vertical bearing in frame 61, and has upon its upper end a bevel pinion 64, which also serves as a head to said shank. This head preferably rests upon a ball bearing 65, and thus is enabled to revolve easily. Arranged at right angles with shank 63 is a shaft 66 having on one end a bevel pinion 67 which engages with pinion 64 on the shank. Said shaft 66 also has a cog wheel 68, and a rack bar 69 is secured to the frame of the machine, alongside the guideway for the carrier, in position to engage with this cog wheel as the carrier travels past it. Said rack bar is shown as of the pin variety, and this is the form which I prefer, although other forms or their equivalents might be employed. The operation is, as the cog wheel 68 travels past this rack, that said wheel and the shaft 66 will be revolved; and, through its bevel pinions 67 and 64, will revolve the shackle, through its shank 63. The shackle and the carcass attached thereto are thus given a rapid rotary movement horizontally, at the same time the carcass is traveling vertically through the machine and being acted upon by the scrapers, as will be presently more fully described.

The traveling carrier and parts attached thereto are guided and kept accurately to place by means of the guideways or tracks 40, which are rigidly attached to frame 21, and within which the carrier chains lie during the ascending portion of their travel.

The lower or engaging portion of the shackle is composed of two arms 71 and 72 pivotally connected to a head 73 on lower end of shank 63 by pivots 74 and 75. The upper ends of arms 71 and 72 develop into operating levers, and these are connected at their upper ends by a toggle 76 adapted to be operated by a yoke-shaped lever 77 through a head 78 to which the adjacent ends of the links of the toggle are connected. The position of the lever 77 is normally the lower one, as shown by full lines in Fig. 8 and by dotted lines in Fig. 13. When in this position, the shackle arms 71 and 72 are together, with their halved ends overlapped, as shown in Fig. 16, and are thus adapted and adjusted to securely hold the ring of the hook (as $h$, see Fig. 1) upon which the carcass to be treated is immediately mounted. When, however, the scraping operation has been completed, and the carrier is approaching the end of the path of travel through which the carcass is designed to pass, the end of lever 77 will come in contact with a strike 79 on the adjacent portion of the frame work, as just below the carrier driving wheels 35 and 36, which has the effect to raise said lever to the position indicated by the full lines in Fig. 13 and also in Fig. 21, and to thereby operate the shackle-arms 71 and 72, and to permit the hook carrying the carcass to be freely dropped therefrom, whence it will fall on to the chute 81 (see especially Fig. 2), and thence pass to a place for further treatment. The construction of the shackle and its operation will be clearly understood from an inspection of Figs. 8, 11, and 12 to 16 inclusive. Its operation and use will be understood from the diagrammatic illustration at the lower end of Fig. 1.

The arrangement, relative location, and means for securing proper relative position of the scrapers, is best illustrated in Figs. 6 and 7; the means for driving the scrapers, in Figs. 3, 4 and 5; and the detail construction of one form of said scrapers in Figs. 17 and 18, and of another form in Figs. 19 and 20. Each of these scrapers is mounted in suitable bearings upon a swinging frame 91 carried at one end by a swinging link 92 and at the other end by an arm 93, which, in turn, is carried by a rock shaft 94. Said shaft 94 has also mounted thereon another arm 95, and this is connected by a link 96 to a corresponding arm 95′ (extending, however, in a different direction) on a similar shaft 94′ on the opposite side of the machine and bearing the same relation to the opposite scraper of the pair that the shaft 94 does to the scraper now being described. By means of this form of yielding support two scrapers of each pair are caused to approach and recede from each other uniformly, so that the two scrapers maintain uniform distances from the center of the machine and the path of the traveling carrier by which the carcasses are carried. An arm 101 rigidly secured to one of said shafts and an adjustable weight 102 thereon provide the means whereby the scrapers are normally held toward each other to the predetermined distance or limit. In order to secure a thoroughly effective action of the scrapers on the carcasses this limit is closer than the distance required for the shackles and their operating devices to pass, as is shown in Fig. 7. I therefore, as most plainly shown in Figs. 6, 7, and 9, provide inclined tracks 103 on the swinging frames 91 with which strikes 104 (preferably in the form of rollers) on the bars 43 of the carrier will come in contact, as the said bars approach the scrapers, thus pushing the scraper frames back and giving sufficient room for the shackles to pass. Immediately after the shackles have passed the swinging frames will swing inwardly, under the impulse of weights 102, thus bringing the scraper blades of the two scrapers of the pair close together, and into position for effective operation. This movement of the scrapers and their frames is thus entirely automatic; and the scrapers are at all times held as closely together as the passing structures or work permits.

I have shown the scrapers as constructed in two alternative forms. In Figs. 17 and 18, I have shown that form of scrapers which I have used during the initial portion of the operation; and, in Figs. 19 and 20 I have shown that form of scrapers which I use at the end of the operation, or for finishing. It is practicable to use either form of scrapers, especially that illustrated in Figs. 19 and 20, throughout the entire operation; but, according to my experience, there are some advantages in using the two forms illustrated. Each of the forms comprises a hub having radially positioned flexible blades. In Figs. 17 and 18, the hub 111 has bolted thereto angle irons 112, and upon one side of each of these angle irons is a comparatively long flexible scraping blade 113, while upon the opposite side of the angle iron is the shorter supporting blade or spring 114, which is or may be secured in place by the same bolt 115 by which scraping blade 113 is secured. Interspersed between the blades of the scraper are guards 116, in the form of rings, bent, laterally, to pass between the several rows of blades, which are staggered, and supported by radial arms 117 carried by the hub 111; the inner ends of said arms, in the construction shown, also serving as a portion of the bolts by which the angle irons 112 are secured to the hub 111. The object of these guards is to limit the amount which the blades of the scraper may be deflected, both insuring against breakage of the blades by excessive deflection, and also keeping them presented at the proper angle to the work for effective operation. The carcass, in passing between the scrapers, when the blades have been deflected to the extent indicated, will come in contact with these guards, and is thus unable to push any farther in toward the hubs of the scrapers, so as to further deflect the blades, which, if permitted, might result in breakage of blades and a less efficient performance of the work. The shorter blades or springs 114 serve as reinforcements for the main scraping blades 113, causing them to bend less abruptly at the inner ends or attaching points, and thus causing them to more strongly withstand the stresses to which they are subjected, which avoids a considerable amount of breakage which is otherwise likely to occur. The form shown in Figs. 19 and 20 is quite similar to that shown in Figs. 17 and 18, except that the blades are smaller and closer together. The hub 211 has secured thereto a series of blocks 212, to which the scraping blades 213, and also the reinforcing or strengthening blades or springs 214, have previously been secured by screws or nails. The blocks 212 are secured to hub 211 by bolts 215. The guard rings 116 are not shown in these drawings, but may be applied and used in the same manner and with the same result as in the form shown in Figs. 17 and 18.

As shown in Fig. 2 of the drawing, there are several pairs of rotary scrapers. Each scraper is or may be a counterpart of every other; or, the upper scrapers may be of a somewhat different although similar construction, as has already been explained. They are all similarly mounted and driven. The construction and mountings have already been described. I will now proceed to describe the means provided for driving them.

As is shown generally in Fig. 2, a main shaft 121 is mounted in the frame work, and is driven by means of a belt 122 running from some suitable source of power (not shown) to a pulley 123 on said shaft. Shaft 121 is shown as having a spur gear 124, and this is shown as engaging with a similar gear 125 on shaft 126. The two shafts, 121 and 126, therefore revolve in opposite directions. Said shafts each bear a series of sprocket wheels, and two other corresponding shafts 127 and 128 on the opposite side of the machine also bear a similar series of sprocket wheels. Chain belts extend between these sprocket wheels, belt 131 running from a sprocket wheel on shaft 121 to a corresponding wheel on shaft 128, and belt 132 running from a sprocket wheel on shaft 126 to a corresponding sprocket wheel on shaft 127. The desired opposite direction of rotation of the shafts is thus secured.

Other sprocket wheels mounted on these several shafts serve through chain belts to drive the several rotary scrapers. The construction and arrangement is illustrated in detail in Figs. 3, 4, and 5, and generally in Fig. 2. In said Fig. 2 the various chain belts are represented by dotted lines running from the driving sprocket wheels on the shafts which have been described. In Fig. 2 I have shown three pairs of scrapers having the larger or heavier blade construction illustrated in Figs. 17 and 18, and a final or upper pair having the smaller or lighter blade construction illustrated in detail in Figs. 19 and 20. The first named three pairs are indicated as revolving downwardly at their adjacent sides, while the scrapers of the upper pair are indicated as revolving upwardly at their inner sides. The three lower pairs of scrapers are indicated as being driven by means of chain belts 133 from the shafts 126 and 128, while the upper pair are indicated as being driven by chain belts 134 from the shafts 121 and 127. The number of pairs of scrapers, and the directions in which they shall run, may of course be varied as may be desired. The number, arrangement and direction illustrated is, however, according to my experience, a desirable one and is very effectual for the purpose.

In Fig. 2 of the drawing I show a number of pipes 140 leading in to points adjacent to the rotary scrapers, where they are preferably provided with sprinkling heads. Hot water, which may be impregnated with some material tending to facilitate the removal of the bristles, such as soda, is conducted through these pipes, and discharged downwardly on to the ascending carcasses as they are being scraped. This not only aids in keeping the carcasses in condition to be thoroughly and easily scraped, but it also washes down and carries away the resulting debris.

In operation, the carcasses to be treated are taken directly from the scalding tub 150 (see Fig. 2), and are connected by means of suitable hooks to the shackles on the carrier, and are thence drawn into and through the machine, as has previously been described. The result is a very rapid and thorough scraping and cleaning of the carcasses, and the delivery thereof to a point beyond the machine in excellent condition for further treatment.

Having thus fully described my said invention, what I claim as new, and desire to secure by Letters Patent, is,

1. The combination, in a hog scraping machine, with the frame work and traveling carrier, of a rotary scraper, composed of a hub having a series of radially extending flexible scraper blades secured therein, and guard rims arranged circumferentially between said scraper blades between the hubs of the scraper and the points of said blade which will come in contact with the carcass when the blades are deflected to the predetermined limit and prevent further deflection thereof.

2. The combination, in a hog scraping machine, with the frame work and traveling carrier, of a rotary scraper composed of a hub having a series of radially extending flexible scraper blades secured therein, and spaced axially thereof, a shorter flexible spring support for each of said scraper blades secured alongside the base thereof in the hub, and circumferential guard rings arranged between the blades whereby excessive deflection of the latter is prevented.

3. The combination, in a scraping machine, of a frame, a traveling carrier, a plurality of pairs of scrapers arranged alongside the path of said carrier, one scraper of each pair being on either side of said path, yielding supports by which the several scrapers are carried, independent driving means connected to each pair of scrapers whereby each pair is driven separately from the other, means adapted to intermittently move the yielding supports of each pair apart and means acting normally to force the scrapers against the carcass to be scraped at a predetermined pressure.

4. The combination, in a scraping machine, of a frame, a traveling carrier, a plurality of pairs of scrapers arranged alongside the path of said carrier, one scraper of each pair being on either side of said path, yielding supports by which the several scrapers are carried, and driving means connected to the scraper of each pair, said driving means being arranged to cause the individual scrapers of each pair to revolve in opposite directions, means adapted to intermittently move the yielding supports of each pair apart and means acting normally to force the scrapers against the carcass to be scraped.

5. The combination, in a hog scraping machine, of a frame work, a traveling carrier, rotary scrapers arranged in pairs opposite to each other, yielding supports on which said scrapers are mounted, rock shafts from which said supports are suspended, arms on said rock shafts, and a link extending from an arm on one rock shaft across to the corresponding arm on the other rock shaft of the pair, whereby the swinging movements of the two scrapers of the pair are rendered synchronous.

6. The combination, in a scraping machine, of a frame, a traveling carrier, rotary scrapers arranged in pairs opposite each other, driving shafts arranged in pairs from which the rotary scrapers are separately driven, means acting to drive the individual scrapers of the pairs to revolve in opposite directions, means adapted to intermittently move the scrapers of each pair apart, and means acting normally to force the scrapers against the carcass to be scraped with predetermined pressure.

7. The combination, in a hog scraping machine, of a traveling carrier, scrapers arranged adjacent to the path of said carrier, yielding supports upon which said scrapers are mounted, shackles carried by the carrier for attaching the carcasses thereto, shoes attached to the frames of the yielding carrier supports, and strikes carried by the carrier at points adjacent to the shackles, whereby the yieldingly mounted scrapers are caused to swing apart as the shackles approach for passing them.

8. The combination, in a carcass scraping machine, of a vertical frame work, a traveling carrier running vertically therein, whereby the carcasses are carried vertically up between the scrapers, revolving scrapers arranged in pairs adjacent to the path of said carrier, yielding supports upon which the said revolving scrapers are mounted, connections between the several pairs of scrapers whereby they are caused to approach and recede from each other uniformly, shackles carried by said carriers for attaching the carcasses thereto, means acting normally to force said scrapers against the carcass to be scraped with a predetermined pressure, and means for automatically disengaging said shackles at the discharging point.

9. In a device of the class described a frame, rock shafts, a plurality of arms secured to said rock shafts, a plurality of links secured to said frame, movable supporting frames connected with said arms and links, a carrier, shackles for attaching the carcasses thereto, scrapers mounted upon said movable supports, shoes attached to the frames of the movable supports, means adapted to contact said shoes to move said supports apart to permit the shackles to pass, and adjustable means adapted to force the scrapers against the carcass at a predetermined pressure.

10. In a device of the class described a frame, shafts journaled thereon, supporting arms on said shafts, links connected with said frame, movable supporting frames secured to said arms and links, means connecting the shafts adapted to render the movements of the frames simultaneous, a traveling carrier, shackles carried by the carrier for attaching the carcasses thereto, scrapers mounted upon said movable frames, shoes attached to said frames, strikes adapted to contact said shoes to move said supports apart to permit the shackles to pass, and adjustable means adapted to force the scrapers against the carcass at a predetermined pressure.

11. In a device of the class described a frame, shafts journaled thereon, a movable supporting frame suspended from each shaft, a carrier, shackles for attaching the carcasses thereto, scrapers mounted upon said movable supports comprising a plurality of flexible scraper blades adapted to contact with the carcass when the blades are deflected to a predetermined limit, shoes attached to the frame of the movable supports, means adapted to contact said shoes to move said supports apart to permit the shackles to pass, and regulating means adapted to force the scrapers against the carcass.

12. In a device of the class described a frame, movable supporting frames yieldingly secured to said frame, means connected with said frames adapted to move a plurality of said frames simultaneously, a carrier, a shackle carried by said carrier for attaching the carcass thereto, scrapers mounted upon said movable supports having a plurality of flexible scraper blades secured therein, means adapted to move the scraper supports and means acting normally to force the scrapers against the carcass at a predetermined pressure.

13. In a device of the class described a frame, movable supporting frames yieldingly secured to said frame, a traveling carrier, a plurality of shackles carried by said carrier for attaching the carcass thereto, scrapers mounted upon said movable supports, means adapted to move the scraper supports apart to permit the shackles to pass, and means acting normally to force the scrapers against the carcass at a predetermined pressure.

14. In a device of the class described, a carrier, a plurality of frames connected with said carrier, a shank mounted to revolve in each frame, a beveled pinion upon one end thereof, a shank having a beveled pinion thereon adapted to engage with the first mentioned beveled pinion to rotate the first mentioned shank, means adapted to continuously rotate the shanks, and a shackle mounted upon one of said shanks for attaching the carcass thereto.

15. In a device of the class described a frame, rock shafts thereon, a movable supporting frame suspended from each shaft, a traveling carrier, scrapers mounted upon said movable supports and means adapted to move the scraper supports apart to permit the shackles to pass.

16. In a device of the class described a frame, shafts thereon, a movable supporting frame suspended from each of said shafts, means connected with said frames adapted to move a plurality of said frames simultaneously, a carrier, means adapted to rotate said carriers, a shackle mounted upon one of said carriers for attaching the carcass thereto, scrapers mounted upon said movable supports, means adapted to force the scraper supports to move apart to permit the shackles to pass, and means acting normally to force the scrapers against the carcass at a predetermined pressure.

17. In a device of the class described a frame, links pivoted thereto, rock shafts journaled on the frame, supporting arms secured to said rock shafts, movable supporting frames secured to said arms and links, means connected with said frames adapted to cause said frames to move in pairs, scrapers mounted on said movable frames, traveling means for gripping the carcass to carry it therepast, means adapted to force the scraper frames to move apart to permit the passage of said gripping means and means acting to normally force the scrapers against the carcass.

18. In a device of the class described a frame, rock shafts journaled thereon, supporting arms on said rock shafts, links pivoted to said frame, supporting frames connected with said arms and links, means connecting said rock shafts adapted to render the movements of the opposite frames synchronous, a carrier, shackles carried by the carrier for attaching the carcass thereto, rotatable scrapers mounted upon said supports, shoes attached to the supports, strikes adapted to contact said shoes to move said supports apart to permit the shackles to pass, and adjustable means acting normally to force the scrapers against the carcass at a predetermined pressure.

19. In a device of the class described a frame, links thereon, rock shafts journaled on the frame, supporting arms rigidly secured to said rock shafts, movable supporting frames connected with said arms and links, a relatively short arm secured to each rock shaft, a link connecting said relatively short arms adapted to render the movements of said frames simultaneous, a carrier, shackles carried by the carrier for attaching the carcasses thereto, scrapers mounted upon said movable supports, shoes attached to the frames of the movable supports, and strikes carried by the carrier at points adjacent to the shackles whereby the movable scraper supports are caused to move apart to permit the shackles to pass.

20. In a device of the class described a frame, a plurality of pairs of oppositely disposed rock shafts journaled thereon, a plurality of supporting arms rigidly secured to said rock shafts, a plurality of links pivoted to said frame, movable supporting frames connected with said arms and links, a relatively short arm secured to each rock shaft, a link connecting the complemental arms of each pair of rock shafts adapted to render the movements of a pair of frames simultaneous, a carrier, shackles carried by the carrier for attaching the carcasses thereto, rotatable scrapers mounted upon said movable supports adapted to contact the carcass to a predetermined limit.

21. In a device of the class described a vertical frame, a plurality of pairs of oppositely disposed rock shafts journaled thereon, a plurality of downwardly directed supporting arms rigidly secured to said rock shafts, a plurality of links pivoted to said frame, horizontally movable supporting frames pivotally secured to said arms and links, a relatively short arm secured to each rock shaft, and a link connecting the complemental arms of each pair of rock shafts adapted to render the movements of the opposite frames simultaneous.

22. In a hog scraping machine of the class described a frame, a traveling carrier, a rotary scraper, composed of a hub having a series of flexible scraper blades secured therein and concentric rings secured on said hub between said scraper blades adapted to come in contact with the carcass when the blades are deflected to the predetermined limit and prevent further deflection thereof.

23. In a device of the class described a frame, a traveling carrier, a plurality of rotary scrapers arranged in pairs opposite to each other, yielding supports on which said scrapers are mounted, rock shafts from which said supports are suspended, and means affording a connection between the rock shafts whereby the swinging movements of the two scrapers of the pair are rendered synchronous.

24. In a device of the class described a traveling carrier, scrapers arranged adjacent to the path of said carrier, yielding supports upon which said scrapers are mounted, shackles carried by the carrier for attaching the carcasses thereto, shoes attached to the frames of the yielding scraper supports, and strikes carried by the carrier at points adjacent to the shackles, whereby the yieldingly mounted scrapers are caused to swing apart as the shackles approach for passing them, and means adapted to force the yielding supports to swing together after the shackles have passed said shoes.

25. A device of the class described embracing a scraper, composed of a hub having a series of scraper blades secured therein, and concentric guard rims staggered between said scraper blades adapted to contact with the carcass when the blades are deflected to the predetermined limit and prevent further deflection thereof.

26. A scraping machine embracing a frame work, a traveling carrier, scrapers arranged in pairs opposite to each other, yielding supports on which said scrapers are mounted, rock shafts from which said supports are suspended, arms on said rock shafts, a link extending from an arm on one rock shaft across to the corresponding arm on the other rock shaft of the pair, whereby the swinging movements of the two scrapers of the pair are rendered synchronous, and means secured to one of the rock shafts of each pair acting normally to force the yielding supports of each pair in close relation.

27. In a device of the class described a traveling carrier, scrapers arranged adjacent to the path of said carrier, guards adapted to contact the carcass, yielding supports upon which said scrapers are mounted, shackles carried by the carrier for attaching the carcasses thereto, shoes attached to the frames of the yielding scraper supports, and strikes carried by the carrier at points adjacent to the shackles, whereby the yieldingly mounted scrapers are caused to swing apart as the shackles approach for passing them.

28. A scraping machine embracing a frame, a traveling carrier, rotary scrapers, guards arranged circumferentially, said scraper adapted to contact with the carcass at a predetermined limit, rock shafts journaled upon said frame, yielding supports suspended from said shafts and having said scrapers mounted thereon, arms on said rock shafts, means connecting said arms whereby the movements of the two scrapers of the pair are rendered synchronous, and means acting normally to force the yielding supports of each pair in close relation.

29. A hog scraping machine embracing a vertical frame, a traveling carrier, rotary scrapers arranged in pairs opposite to each other, horizontally movable supports on which said scrapers are mounted, rock shafts from which said supports are suspended, means affording a connection between said rock shafts adapted to move a pair of the opposed scrapers horizontally, and gravitational means acting normally to force said supports in close relation.

30. A scraping machine embracing a traveling carrier, shackles carried by the carrier for attaching the carcasses thereto, scrapers arranged adjacent to the path of said carrier, yielding supports upon which said scrapers are mounted, shoes attached to the frames of the yielding scraper supports, strikes carried by the carrier at points adjacent to the shackles, whereby the yieldingly mounted scrapers are caused to swing apart as the shackles approach for passing them, and adjustable gravitational means adapted to force the scrapers against the carcass at a predetermined pressure.

31. The combination with a machine of the class described of a scraper comprising a hub, scraper arms secured thereon, a reinforcing arm slightly removed therefrom but adjacent thereto and a concentric ring extending around said hub and secured thereto adapted to limit the movement of said scraper arms and prevent a carcass from being thrust therebetween.

32. A machine of the class described embracing shafts journaled thereon, arms thereon, a sliding weight on one arm, a scraper frame pivoted at one end to the other, a scraper thereon, a pivoted arm supporting the other end of said frame, and a link connecting the arms on opposite shafts to insure synchronous movement of the scrapers.

33. In a machine of the class described a conveyer, scrapers adjacent thereto, a frame, a shank journaled therein, gripping means on one end thereof, a rack extending along the conveyer, a pinion journaled in said frame to engage the rack, and gearing connecting said pinion and shank adapted to continuously rotate a carcass secured thereto during its progress past said scrapers.

In witness whereof, I, have hereunto set my hand and seal at Indianapolis, Indiana, this first day of May, A. D. one thousand nine hundred and nine.

JAMES CUNNING. [L. S.]

Witnesses:
CHESTER BRADFORD,
O. E. McMEANS.